(12) United States Patent
Hasegawa et al.

(10) Patent No.: US 9,376,030 B2
(45) Date of Patent: Jun. 28, 2016

(54) CHARGER AND METHOD OF CONTROLLING CHARGER

(71) Applicant: NISSAN MOTOR CO., LTD., Kanagawa (JP)

(72) Inventors: Noriaki Hasegawa, Zama (JP); Tatsuo Nakahara, Ebina (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 342 days.

(21) Appl. No.: 14/349,440

(22) PCT Filed: Sep. 28, 2012

(86) PCT No.: PCT/JP2012/075158
§ 371 (c)(1),
(2) Date: Apr. 3, 2014

(87) PCT Pub. No.: WO2013/051482
PCT Pub. Date: Apr. 11, 2013

(65) Prior Publication Data
US 2014/0232327 A1    Aug. 21, 2014

(30) Foreign Application Priority Data

Oct. 7, 2011    (JP) .................... 2011-222666

(51) Int. Cl.
| H02J 7/00 | (2006.01) |
| H02J 7/14 | (2006.01) |
| B60L 11/18 | (2006.01) |
| G07F 15/00 | (2006.01) |
| B60L 3/00 | (2006.01) |
| H01M 10/44 | (2006.01) |

(52) U.S. Cl.
CPC .............. B60L 11/1848 (2013.01); B60L 3/00 (2013.01); B60L 11/185 (2013.01); B60L 11/1825 (2013.01); G07F 15/005 (2013.01); H02J 7/0004 (2013.01); H02J 7/0021 (2013.01); H02J 7/0027 (2013.01); H02J 7/0052 (2013.01); B60L 2230/16 (2013.01); B60L 2230/40 (2013.01); B60L 2240/70 (2013.01); B60L 2250/16 (2013.01); B60L 2250/20 (2013.01); H01M 10/44 (2013.01); H02J 2007/0096 (2013.01);
(Continued)

(58) Field of Classification Search
CPC ..................................... Y02T 90/163
USPC ....................................... 320/109
See application file for complete search history.

(56) References Cited

U.S. PATENT DOCUMENTS

| 8,346,401 B2* | 1/2013 | Pollack ............... B60L 11/1824 700/291 |
| 8,509,976 B2* | 8/2013 | Kempton ............ B60L 11/1824 320/101 |

(Continued)

FOREIGN PATENT DOCUMENTS

| JP | 09037479 A | 2/1997 |
| JP | 2004222457 A | 8/2004 |

(Continued)

*Primary Examiner* — Edward Tso
*Assistant Examiner* — Ahmed Omar
(74) *Attorney, Agent, or Firm* — Young Basile Hanlon & MacFarlane P.C.

(57) ABSTRACT

A charger configured to charge a battery, is provided with a controller configured to control charging of the battery and a communication interface interposed between the controller and an accounting system. The controller waits for an input of a signal from the accounting system via the communication interface. The controller starts to control the charging of the battery under the condition that a signal is inputted from the accounting system via the communication interface.

10 Claims, 11 Drawing Sheets

(52) U.S. Cl.
CPC ...... *H02J 2007/0098* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2006/0269312 A1 | 11/2006 | Muraishi |
| 2008/0252254 A1 | 10/2008 | Osada |
| 2010/0283425 A1 | 11/2010 | Osada |
| 2011/0016063 A1 | 1/2011 | Pollack et al. |
| 2012/0274277 A1 | 11/2012 | Masuda et al. |

FOREIGN PATENT DOCUMENTS

| | | |
|---|---|---|
| JP | 2006333648 A | 12/2006 |
| JP | 2007107998 A | 4/2007 |
| JP | 2007252175 A | 9/2007 |
| JP | 2008086192 A | 4/2008 |
| JP | 2010110068 A | 5/2010 |
| JP | 2010114988 A | 5/2010 |
| JP | 2011023271 A | 2/2011 |
| WO | 2011-009129 A1 | 1/2011 |
| WO | 2011086695 A1 | 7/2011 |

\* cited by examiner

FIG. 4A
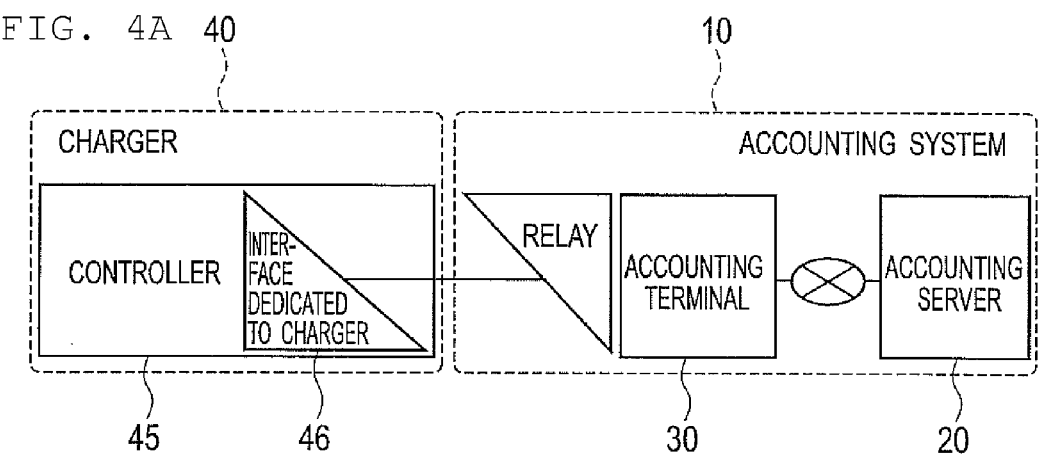
FIG. 4B
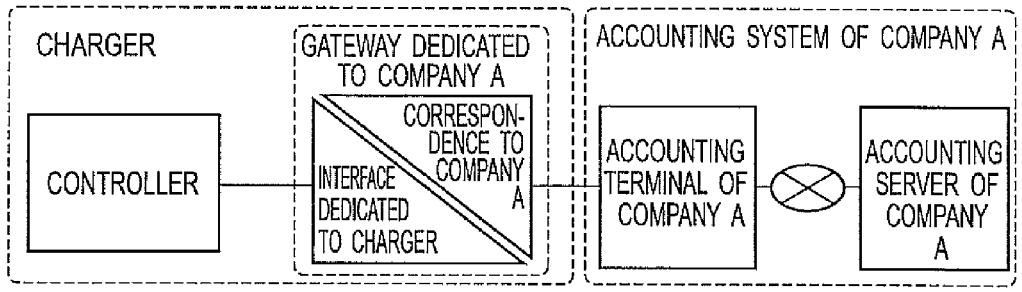
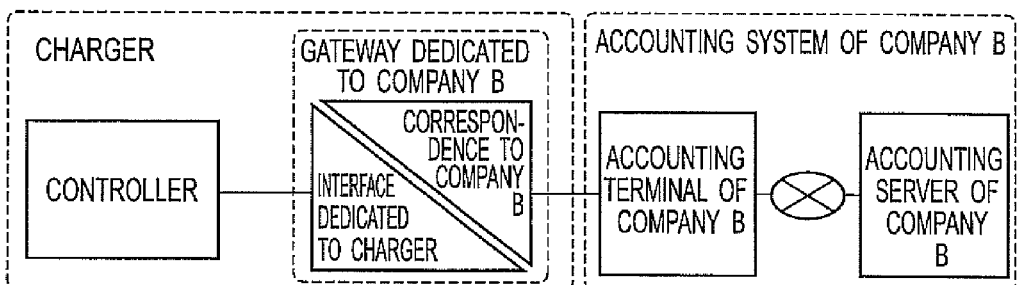

FIG. 7A

STARTING

FIG. 7B

RETURN | SELECT LANGUAGE

WELCOME
TOUCH ANYWHERE
INSIDE FRAME

ADMINISTRATION | MAINTENANCE

FIG. 7C

RETURN | SET CHARGING TIME

15 MINUTES

RETURN | SET STATE OF CHARGE

RETURN | YOU CAN CHARGE

CONNECT CHARGING CONNECTOR AND
PRESS START CHARGE BUTTON
CHARGING WILL START AUTOMATICALLY

HELP | 15 MINUTES

FIG. 7F

RESET ABNORMALITY | ABNORMALITY OCCURRED
ABNORMALITY | ABNORMALITY CODE [0x0401]
UPPER LIMIT OF OUTPUT POWER > VALUE OF CURRENT CHARGER CAN OUTPUT
ABNORMALITY OR BREAKDOWN OCCURRED IN YOUR CAR
CHECK YOUR CAR AND PRESS "RESET ABNORMALITY" BUTTON
02 ABNORMALITIES OCCURRED | PREVIOUS | NEXT
CONTACT:*-***-**

CHARGER AND METHOD OF CONTROLLING CHARGER

CROSS REFERENCE TO RELATED APPLICATION

The present application claims priority to Japanese Patent Application No. 2011-222666, filed Oct. 7, 2011 and incorporated herein in its entirety.

TECHNICAL FIELD

The present invention relates to a charger configured to charge a battery, and to a method of controlling the charger.

BACKGROUND

A technique has been known in which, once battery charging is completed, a charging station sends a management center server information on an amount of charged electric power, and the management center server bills a user for a charging fee corresponding to the amount of charged electric power (see Japanese Patent Application Publication No. 2010-114988 (Paragraph 0066 and FIG. 4), for example).

SUMMARY

In the above-mentioned technique, the charging station is designated as a master, because the charging station actively sends information to the management center server. For this reason, in a case where there are multiple types of management center servers, protocols corresponding to the respective management center servers need to be installed in the charging station on a one-by-one basis. This causes a problem that the charging station is less versatile in dealing with external apparatuses such as management center servers.

A problem to be solved by the present invention is to provide a charger which is versatile in dealing with external apparatuses, and to a method of controlling the charger.

The present invention solves the problem by a scheme in which: a controller waits for input of a signal from an external apparatus via an interface; and the controller starts to control battery charging under the condition that the controller receives the signal from the external apparatus via the interface.

According to the present invention, a charger serves as a slave to external apparatuses, so that protocols corresponding to the respective external apparatuses do not have to be installed on the charger. Thus, the present invention improves versatility of the charger in dealing with the external apparatuses.

BRIEF DESCRIPTION OF DRAWINGS

The description herein makes reference to the accompanying drawings wherein like reference numerals refer to like parts throughout the several views, and wherein:

FIG. 4(a) is a block diagram showing a control system for the charging system in the embodiment of the present invention, and FIG. 4(b) is a block diagram showing control systems for conventional charging systems.

FIGS. 7(a) to 7(f) are diagrams showing examples of images to be displayed on a touch panel corresponding to states shown in FIG. 5, respectively.

DESCRIPTION OF EMBODIMENTS

Figure 1:
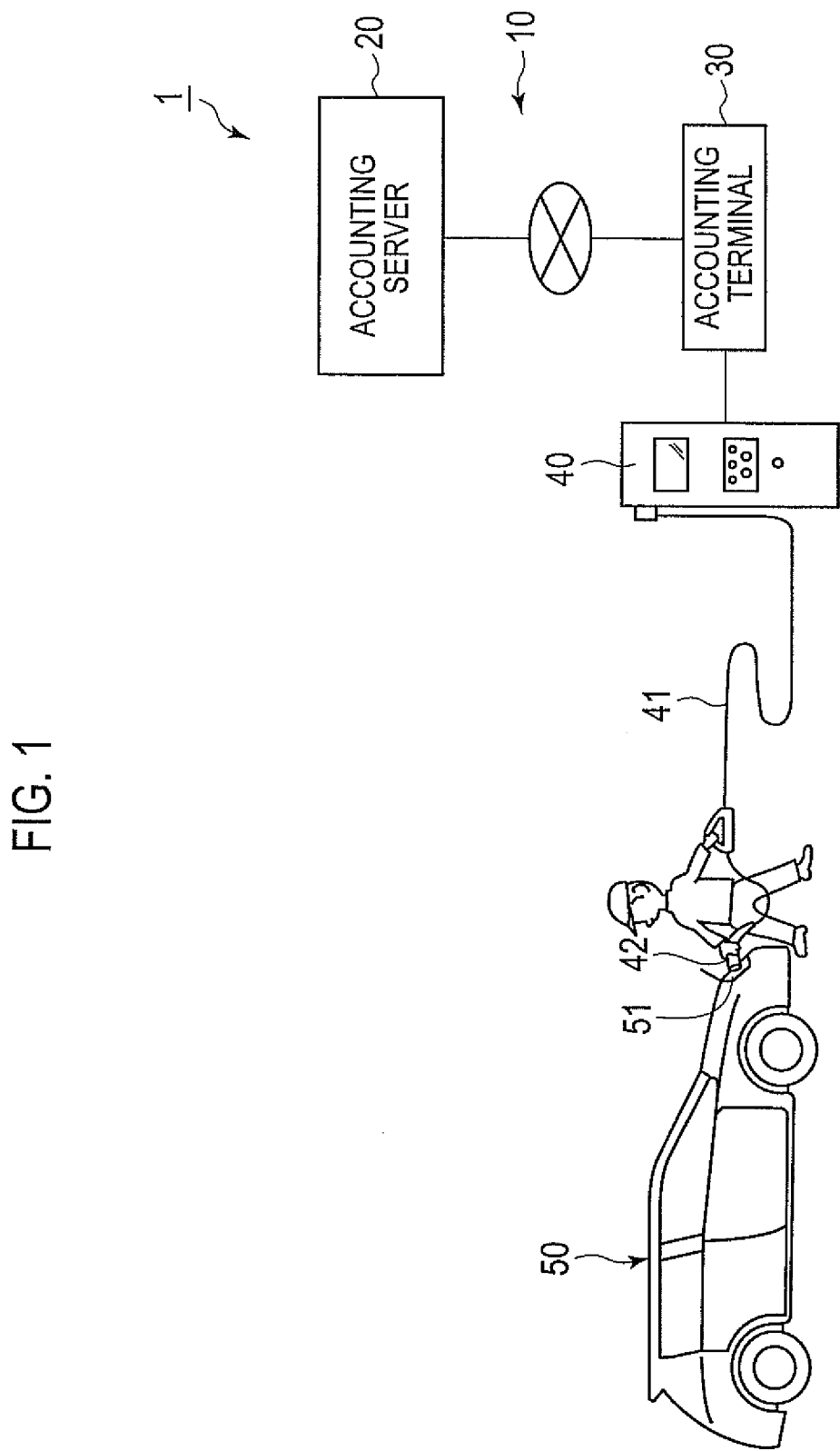
FIG. 1 is a diagram showing an overall configuration of a charging system in an embodiment of the present invention.
Figure 2:
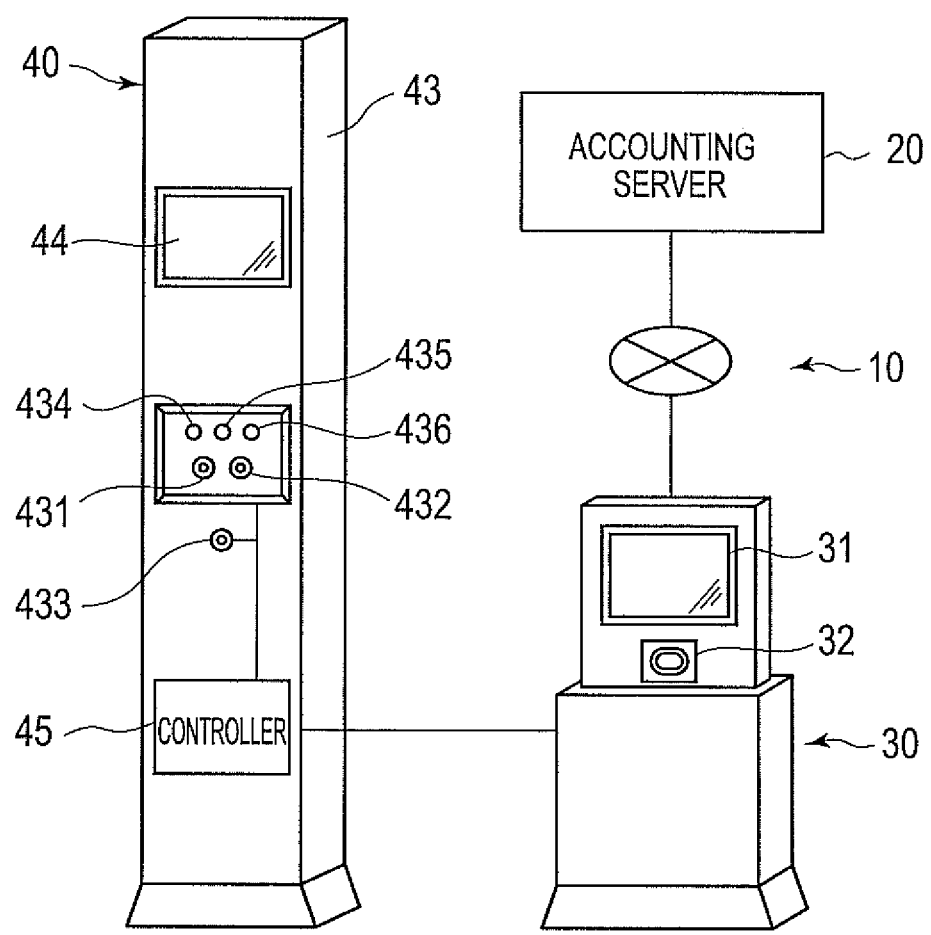
FIG. 2 is a perspective view of a charger and an accounting terminal in the embodiment of the present invention.
Figure 3:
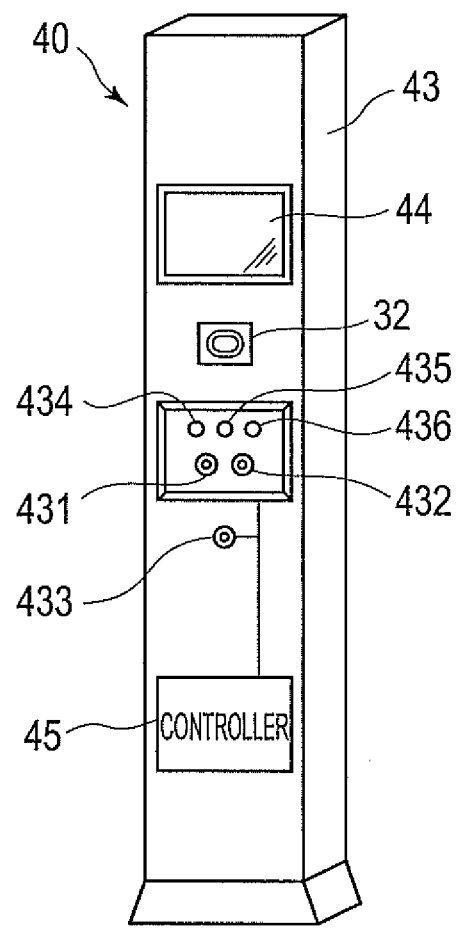
FIG. 3 is a perspective view of another example of the charger and the accounting terminal in the embodiment of the present invention.
Figure 5:
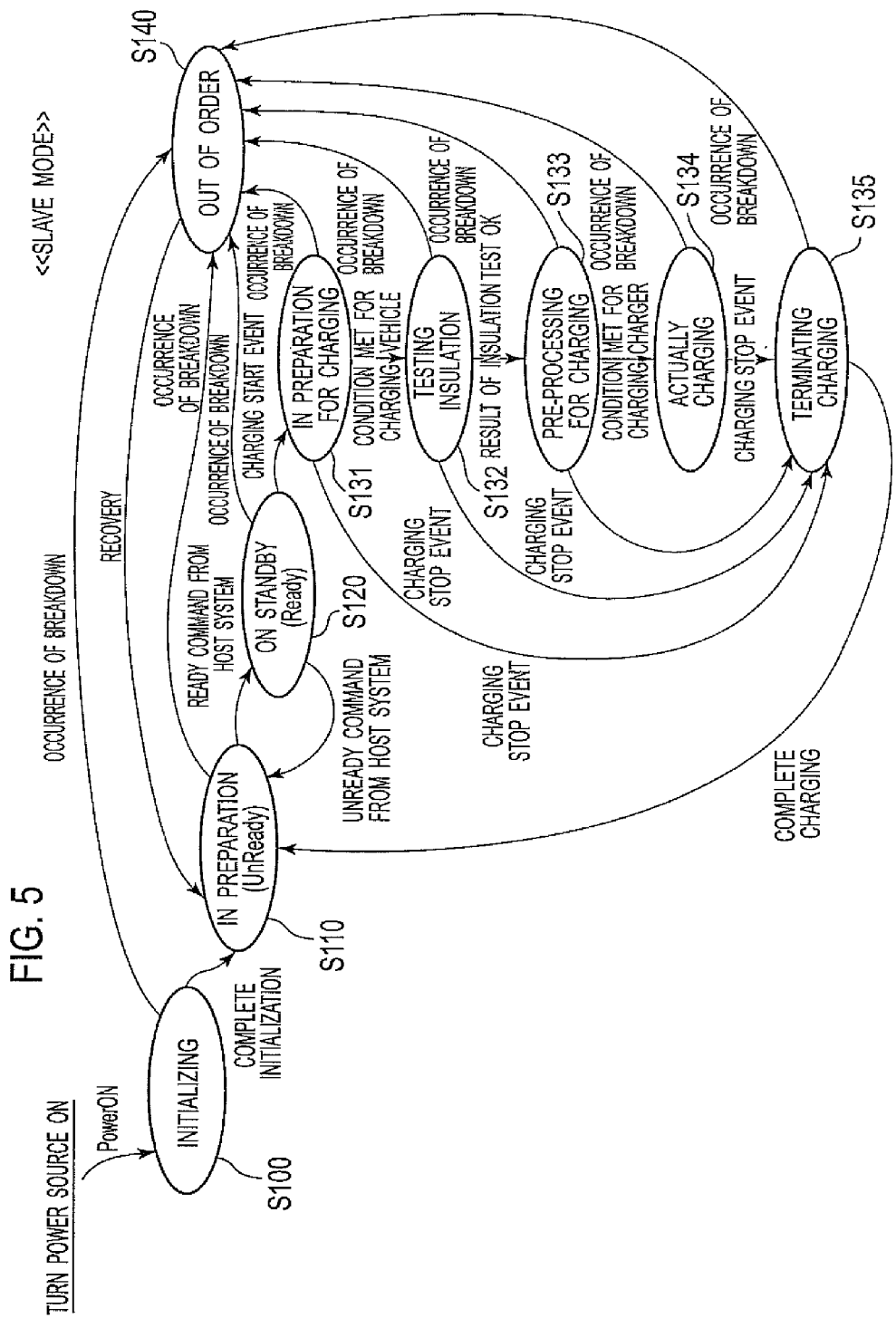
FIG. 5 is a state transition diagram of a slave mode in the embodiment of the present invention.
Figure 6:
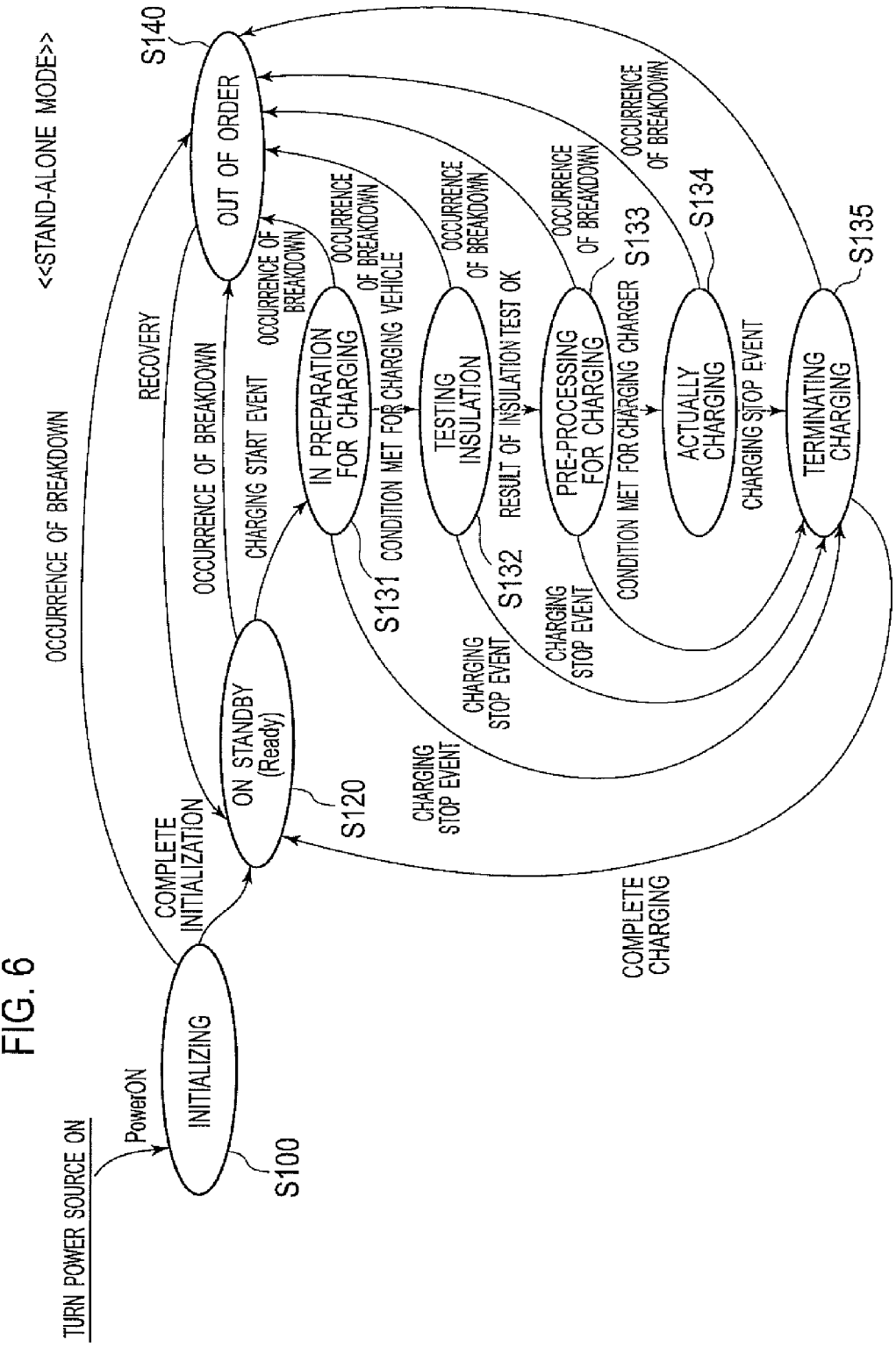
FIG. 6 is a state transition diagram of a stand-alone mode in the embodiment of the present invention.

FIG. 1 is a diagram showing an overall configuration of a charging system in the embodiment. FIG. 2 is a perspective view of a charger and an accounting terminal in the embodiment. FIG. 3 is a perspective view of another example of the charger and the accounting terminal in the embodiment. FIG. 4(a) is a block diagram showing a control system for the charging system in the embodiment. FIG. 4(b) is a block diagram showing control systems for conventional charging systems. FIG. 5 is a state transition diagram of a slave mode in the embodiment. FIG. 6 is a state transition diagram of a stand-alone mode in the embodiment.

As shown in FIG. 1, a charging system 1 of the embodiment is a system configured to charge a traction battery (not illustrated) of a vehicle 50, and to bill a user for a fee corresponding to an amount of charged electric power. The charging system 1 includes an accounting system 10 (a host system) and a charger 40.

The vehicle 50 of the embodiment is a vehicle which includes a motor generator as a power source, and a traction battery configured to perform charge and discharge in conjunction with the motor generator. Examples of the vehicle 50 include electric cars and plug-in hybrid cars.

The accounting system 10 includes an accounting server 20 and an accounting terminal 30. In the embodiment, in addition to billing of the fee, the accounting system 10 is designed to be capable of: monitoring a state of the charger 40 by cyclic communications; giving the charger 40 instructions such as a READY command, which will be described later; and setting conditions for the charger 40 to complete its charging operation, and an upper limit on the charging operation. Here, the accounting system 10 may also be capable of controlling start and stop of the charging operation by the charger 40.

The accounting server 20 is a server configured to perform billing authentication processing for the charging of the battery of the vehicle 50 by the charger 40. The accounting server 20 is connected to the accounting terminal 30 via a network and the like.

In FIG. 1, one charger 40 is connected to one accounting server 20. However, the present invention is not limited only to the foregoing. Multiple chargers 40 may be connected to a single accounting server 20 and the multiple chargers 40 may be managed in a lump by the accounting server 20. Alternatively, a single accounting terminal 30 may deal with multiple chargers 40.

The accounting terminal 30 is provided near the charger 40, for example. The accounting terminal 30 is connected to a controller 45 of the charger 40 via a LAN and the like. As shown in FIG. 2, the accounting terminal 30 includes a touch panel 31 and a card reader 32. The touch panel 31 is an HMI (Human Machine Interface) for the billing authentication. Meanwhile, the card reader 32 is a contactless card reader capable of reading and writing an IC card.

For example, for the billing authentication, a charging operator (for example, a driver) intending the charging operation touches buttons on the touch panel 31 and brings the IC card close to the card reader 32 in accordance with instructions displayed on the touch panel 31 before starting to charge the battery of the vehicle 50. Data in the IC card read by the card reader 32 is sent to the accounting server 20 via the network or the like. Concrete examples of the IC card include a cash card, a credit card, and a prepaid IC card in which a record of electronic money available is stored.

It should be noted that the accounting terminal 30 may be provided with a contact card reader in lieu of the contactless card reader 32. Alternatively, the accounting terminal 30 may be provided with the contact card reader, a coin mech selector (C/M), a bill validator (B/V), or the like in addition to the contactless card reader 32.

The charger 40 is a rapid charging station configured to charge the traction battery of the vehicle 50 by supplying electric power to the vehicle 50. The charger 40 includes a built-in power converter configured to convert commercial AC power into DC power, and to boost the DC power to a predetermined voltage. The charger 40 supplies the battery of the vehicle 50 with the DC power converted by the power converter through a charging cable 41.

As shown in FIG. 1, a charging connector 42 is attached to the extremity of the charging cable 41. When the charging connector 42 is put into a power-supply inlet 51 of the vehicle 50, the charger 40 and the battery of the vehicle 50 are electrically connected together via the charging cable 41.

As shown in FIG. 2, a housing 43 of the charger 40 is provided with a Start Charge button 431, a Stop Charge button 432 and an Emergency Stop button 433. When the charging operator presses the Start Charge button 431 after putting the charging connector 42 into the power-supply inlet 51, the battery of the vehicle 50 starts to be charged. When the charging operator wishes to stop the charging operation after starting to charge the battery, the charging operator presses the Stop Charge button 432. Meanwhile, when the charging operator wishes to stop the charging operation for emergency purpose in case of abnormality during the charging operation, the charging operator presses the Emergency Stop button 433.

The housing 43 of the charger 40 is further provided with three lamps 434 to 436, and a touch panel 44.

The Ready lamp 434 lights up when the charger 40 is ready for charging (in a state S120 in FIGS. 5 and 6 to be described later). The Charge lamp 435 lights up during a period when the battery is being charged after the Start Charge button 431 is pressed (in states S131 to S135 in FIGS. 5 and 6 to be described later). The Alarm lamp 436 lights up or blinks in case of an abnormality such as a malfunction of the charger 40 itself.

The touch panel 44 is an HMI between the charger 40 and the charging operator, and between the charger 40 and a system administrator. The touch panel 44 is used, for example, when the charging operator checks the progress in the charging operation, and when the system administrator performs maintenance and the like of the charger 40.

It should be noted that, as shown in FIG. 3, the functions of the accounting terminal 30 may be incorporated into the charger 40 with the card reader 32 provided in the housing 43 of the charger 40, and with the touch panel 44 of the charger 40 configured to function as the touch panel 31 of the accounting terminal 30 as well.

The charger 40 further includes the controller 45 which is formed from a computer including a CPU, a ROM, a RAM and the like. The controller 45 controls the charging of the vehicle 50 by executing a control program stored in the ROM. As shown in FIG. 4(a), the controller 45 includes a communication interface 46 for making communications with the accounting system 10.

In the embodiment, the controller 45 is designed to be capable of choosing one of two control modes (a "slave mode" and a "stand-alone mode") shown in FIGS. 5 and 6 on the basis of a signal from the accounting system 10 which is inputted via the communication interface 46.

The "slave mode" shown in FIG. 5 is a mode for the charger 40 to operate in accordance with instructions from the accounting system 10. On the other hand, the "stand-alone mode" shown in FIG. 6 is a mode for the charger 40 to operate on a stand-alone basis its own. The "slave mode" in the embodiment corresponds to an example of a first mode in the present invention, while the "stand-alone mode" in the embodiment corresponds to an example of a second mode in the present invention.

Referring to FIGS. 7(a) to 7(f) and 8(a) to 8(f), descriptions will be hereinbelow provided for a sequence in which the controller 45 in the "slave mode" performs its control operation. FIGS. 7(a) to 7(f) and 8(a) to 8(f) are diagrams showing examples of images to be displayed on the touch panel 44 of the charger 40 in states shown in FIG. 5.

First of all, once the power is fed from the charger 40, the controller 45 initializes the charger 40 in a state S100 in FIG. 5, and as shown in FIG. 7(a), displays a "Starting" screen on the touch panel 44.

In the state S100, the controller 45 waits for a predetermined length of time until a cyclic signal is inputted from the accounting system 10 via the communication interface 46. The cyclic signal is transmitted, for example, once in every 100 milliseconds while the predetermined length of time for which the controller 45 stands by is, for example, 8 seconds. It should be noted that the predetermined length of time in the state S100 is not limited to the above-mentioned value and may be set arbitrarily. The cyclic signal from the accounting system 10 in the embodiment corresponds to an example of a first signal in the present invention.

In the state S100, if the controller 45 receives the cyclic signal from the accounting system 10 via the communication interface 46 within the predetermined length of time, the controller 45 selects the "slave mode" shown in FIG. 5. In contrast, if the controller 45 receives no cyclic signal from the accounting system 10 after the elapse of the predetermined length of time, the controller 45 selects the "stand-alone mode" shown in FIG. 6. It should be noted that once cyclic communications are established between the accounting system 10 and the charger 40, the accounting system 10 becomes capable of reading conditions of the charger 40 by way of the cyclic communications. While the controller 45 continues being in the "slave mode," the cyclic communications are maintained.

Once the "slave mode" is selected, the controller 45 displays a screen, as shown in FIG. 7(b), on the touch panel 44 in a state S110 in FIG. 5, and waits for a READY command from the accounting system 10. The state S110 in FIG. 5 in the embodiment corresponds to an example of a first state in the present invention.

In the state S110 in FIG. 5, the accounting system 10 has a control right. For this reason, the controller 45 of the charger 40 cannot start to control the charging of the traction battery until the controller 45 receives the READY command from the accounting system 10. In the state S110, the administrator can manage the charger 40 and provide maintenance of the charger 40 by use of the touch panel 44, for example.

To put it specifically, once the administrator touches a "Management" button or a "Maintenance" button on the touch panel shown in FIG. 7(b), the administrator can select conditions for completing the charging operation (including a charging time it takes to complete the charging operation, an SOC (State of Charge) and the like), and change the charging time as a condition for completing the charging operation (see FIG. 7(c)), or change the SOC in the condition for completing the charging operation. It should be noted that, once an "OK" button in FIG. 7(c) or FIG. 7(d) is pressed, the touch panel returns to the screen shown in FIG. 7(b). Although not specifically illustrated, in a case where one accounting server 20 or one accounting terminal 30 deals with multiple chargers 40, station numbers of the respective chargers 40 may be set in the state S110.

The embodiment is provided with the state S110 which does not allow the controller 45 of the charger 40 to start to control the charging operation. While in the "slave mode," this makes it possible to prevent the charge processing from being started by arbitrarily pressing the Start Charge button 431 of the charger 40 before the completion of IC card verification or despite the setting of the conditions for completing the charging operation or the like.

In the state S110 in FIG. 5, when the READY command is inputted into the controller 45 from the accounting system 10 via the communication interface 46, the controller 45 proceeds to a state S120 in FIG. 5. The READY command is issued to the controller 45 from the accounting system 10 via the communication interface 46, for example, when the charging operator brings the IC card into contact with the card reader 32 of the accounting terminal 30 and thereafter touches an in-frame area to be displayed on the touch panel 24 shown in FIG. 7(b). Once the controller 45 receives the READY command from the accounting system 10, the control right is transferred from the accounting system 10 to the controller 45. The READY command corresponds to an example of a second signal in the present invention.

In the state S120 in FIG. 5, the charger 40 is ready to start to charge the battery at any time if the charging operator presses the Start Charge button 431, since the control right is transferred to the controller 45. FIG. 7(e) shows an example of a screen to be displayed on the touch panel 44 in the state S120 in FIG. 5. The state S120 in FIG. 5 in the embodiment corresponds to an example of a second state in the present invention.

Figure 8A:
FIGS. 8(a) to 8(f) are diagrams showing examples of images to be displayed on the touch panel corresponding to states shown in FIG. 5, respectively.

Once the charging operator presses the Start Charge button 431 of the charger 40, the charge control in states S131 to S135 in FIG. 5 is executed. To put it specifically, first of all, in the state S131 in FIG. 5, the controller 45 acquires information on the current SOC in the traction battery, the presence of trouble in the traction battery, and the like through its communications with the vehicle 50. FIG. 8(a) shows an example of a screen to be displayed on the touch panel 44 in the state S131 in FIG. 5.

Figure 8B:
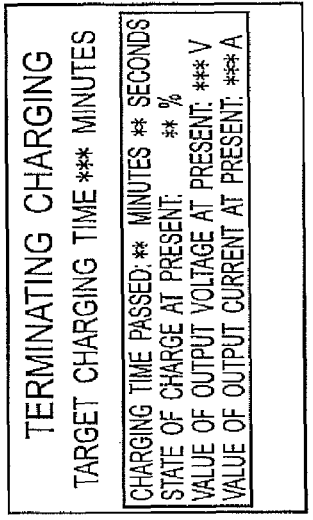
Figure 8C:
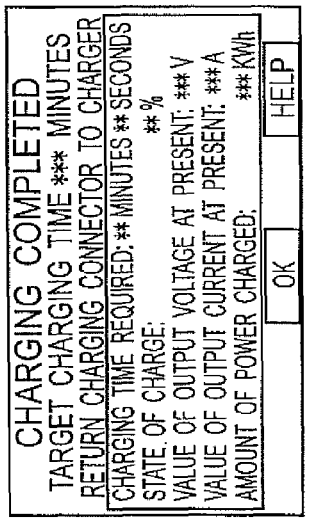

Subsequently, in the state S132 in FIG. 5, the controller 45 performs an insulation test by applying a voltage of approximately 500 volts, for example. Thereafter, in the state S133 in FIG. 5, the controller 45 checks whether or not there is a fault condition in the charger 40 of its own. FIGS. 8(b) and 8(c) show examples of screens to be displayed on the touch panel 44 in the states S132 and S133 in FIG. 5, respectively.

Figure 8D:
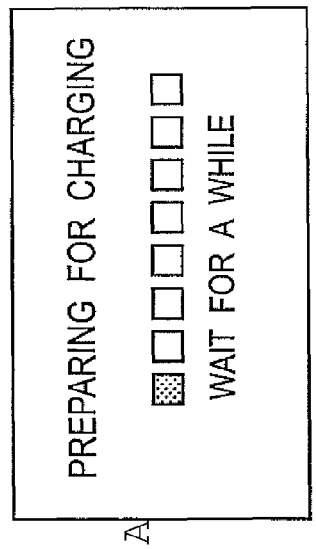

After that, once the conditions for starting the charging operation are established, the controller 45 charges the traction battery in the state S134 in FIG. 5 by actually supplying the DC power to the vehicle 50 from the charger 40. FIG. 8(d) shows an example of a screen to be displayed on the touch panel 44 in the state S134 in FIG. 5.

Figure 8E:
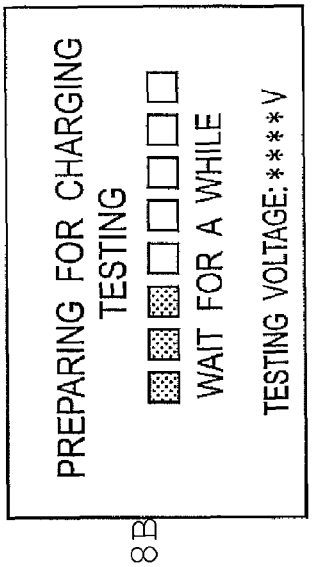

When the conditions for completing the charging operation are established by the charging of the battery of the vehicle 50 in the state S134 in FIG. 5, the controller 45 proceeds to the state S135 in FIG. 5 and stops the charging. FIG. 8(e) shows an example of a screen to be displayed on the touch panel 44 in the state S135 in FIG. 5.

It should be noted that the controller 45 also proceeds to the state S135 in FIG. 5 when a charging stop event occurs as a result of pressing of the Stop Charge button 432 by the charging operator, for example, in the states S131 to S134.

Thereafter, once the process of stopping the charging operation is completed in the state S135 in FIG. 5, the controller 45 sends the results of the charging operation, such as the amount of charged electric power, to the accounting system 10 via the communication interface 46. Then, the controller 45 returns to the state S110 in FIG. 5.

The accounting terminal 30 sends the accounting server 20 the results of the charging operation which are sent from the controller 45 of the charger 40. On the basis of the results of the charging operation, the accounting server 20 performs a settlement process by calculating the fee.

Figure 8F:
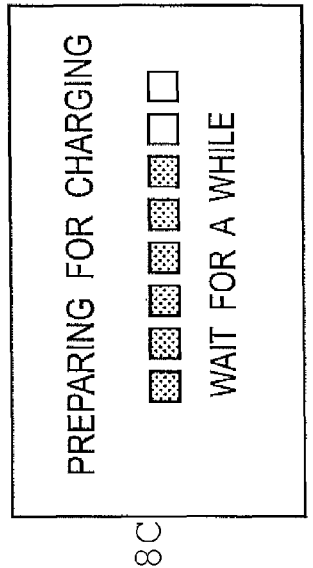

In the embodiment, once the accounting system 10 receives the results of the charging operation from the controller 45 of the charger 40, the control right is transferred from the controller 45 to the accounting system 10, and the controller 45 of the charger 40 becomes unable to start to control any charging operation again. FIG. 8(f) shows an example of a screen to be displayed on the touch panel 44 immediately after the controller 45 proceeds to the state S110 from the state S135 in FIG. 5. Incidentally, after the elapse of a certain length of time, the screen to be displayed on the touch panel 44 switches from the one shown in FIG. 8(f) to the other one shown in FIG. 7(a).

It should be noted that if the charger 40 breaks down while in any of the states S100, S110, S120 and S131 to S135 in FIG. 5, the controller 45 proceeds to a state S140 in FIG. 5, where the controller 45 informs the charging operator of the occurrence of the breakdown. FIG. 7(f) shows an example of a screen to be displayed on the touch panel 44 in the state S140 in FIG. 5.

On the other hand, if the controller 45 of the charger 40 receives no cyclic signal from the accounting system 10 via the communication interface 46 within the predetermined length of time in the state S100 in FIG. 5, the controller 45 switches into the "stand-alone mode" shown in FIG. 6.

The "stand-alone mode" is the same as the "slave mode" shown in FIG. 5, which has been described above, except that the "stand-alone mode" does not include the state S110 in FIG. 5. For this reason, detailed descriptions of the "stand-alone mode" in FIG. 6 will be omitted by denoting the states, which are the same as those in FIG. 5, by reference signs S100, S120, S131 to S135 and S140 as the same as those in FIG. 5.

The "stand-alone mode" does not include the state S110 in which the controller 45 waits for the READY command from the accounting system 10. For this reason, once the "stand-alone mode" is selected, the controller 45 of the charger 40 proceeds from the state S100 to the state S120 in FIG. 6, where the controller 45 of the charger 40 becomes able to start to control the charging of the battery of the vehicle 50 without any instruction from the accounting system 10.

As described above, in the embodiment, the charger 40 is designed to be capable of operate on a stand-alone basis in the case where no signal is inputted into the controller 45 from the accounting system 10. This makes it possible for the charger 40 to charge the battery of the vehicle 50 even if, for example, any one of the accounting server 20 and the accounting terminal 30 breaks down.

Furthermore, in the embodiment, once the cyclic signal is inputted into the controller 45 from the accounting system 10 via the communication interface 46 while the controller 45 is performing the "stand-alone mode," the controller 45 switches from the "stand-alone mode" to the "slave mode."

In the embodiment, similarly, once the cyclic signal from the accounting system 10 is discontinued while the controller 45 is performing the "slave mode," the controller 45 switches from the "slave mode" to the stand-alone mode."

For this reason, the charger 40 used in the "stand-alone mode" can automatically switch to the "slave mode" in midstream. Meanwhile, even if any one of the accounting server 20 and the accounting terminal 30 breaks down after the "slave mode" is selected, the charger 40 can automatically switch to the "stand-alone mode."

In the embodiment, however, while the controller 45 of the charger 40 is in the states of controlling the charging operation (in the states S131 to S135 in FIG. 5), the accounting system 10 is incapable of issuing no instructions to the controller 45. Accordingly, the accounting system 10 can do nothing but to read the condition of the charger 40 through the above-described cyclic communications.

For this reason, if the cyclic signal is inputted into the controller 45 from the accounting system 10 while the controller 45 is in the states of controlling the charging operation in the "stand-alone mode," the controller 45 switches to the state S110 in the "slave mode" (in FIG. 5) after completing the states of controlling the charging operation (i.e., after completing the state S135).

Similarly, if the cyclic signal from the accounting system 10 is discontinued while the controller 45 is in the states of controlling the charging operation in the "slave mode," the controller 45 switches to the "stand-alone mode" (in FIG. 6) after completing the states of controlling the charging operation (i.e., after completing the state S135). In this case, however, the controller 45 switches to the state S120 in the "stand-alone mode." The state S120 in the "stand-alone mode" corresponds to an example of a third state in the present invention.

In the embodiment, the controller 45 has the two modes of the "slave mode" and the "stand-alone mode." However, the present invention is not limited to this configuration. The controller 45 may have the "slave mode" only. In this case, the controller 45 of the charger 40 does not start to control the charging of the traction battery unless the cyclic signal is inputted from the accounting system 10 into the controller 45 via the communication interface 46 within the predetermined length of time while in the state S100 in FIG. 5.

In a case of a conventional charger where the charger is the master to external systems, protocols corresponding to the respective accounting systems have to be installed in the charger. To put it specifically, as shown in FIG. 4(b), for example, in order to deal with an accounting system of a company A, a gateway dedicated to the company A has to be provided to the charger, and in order to deal with an accounting system of a company B, a gateway dedicated to the company B has to be provided to the charger. This makes the charger less versatile.

In contrast, in the embodiment, the controller 45 of the charger 40 waits for the signals (the cyclic signal and the READY command) to be inputted from the accounting system 10 via the communication interface 46 (in the states S100 and S110 in FIG. 5), and the controller 45 starts to control the charging of the traction battery of the vehicle 50 (in the states S131 to S135 in FIG. 5) when as at least one condition, the signals are inputted from the accounting system 10 via the communication interface 46.

To this end, the charger 40 is the slave to the accounting system 10, and as shown in FIG. 4(a), it is not necessary to install the respective protocols corresponding to the accounting systems in the charger 40. This makes the charger 40 more versatile in dealing with external apparatuses such as accounting servers.

It should be noted that in the case where the command to start the charging is also to be inputted into the controller 45 from the accounting system 10 via the communication interface 46, the condition for starting to control the charging of the traction battery in FIG. 5 is only the inputs of the signals (the cyclic signal, the READY command and the Start Charge command) from the accounting system 10 via the communication interface 46.

As a result, in the embodiment, the controller 45 of the charger 40 starts to control the charging of the traction battery when as at least one condition, the signals are inputted from the accounting system 10 via the communication interface 46 (at least under the condition that the signals are inputted from the accounting system 10 via the communication interface 46)

The controller 45 of the charger 40 in the embodiment corresponds to an example of a controller in the present invention. The communication interface 46 of the charger 40 in the embodiment corresponds to an example of an interface in the present invention. The accounting system 10 in the embodiment corresponds to an example of an external apparatus in the present invention.

Figure 9:
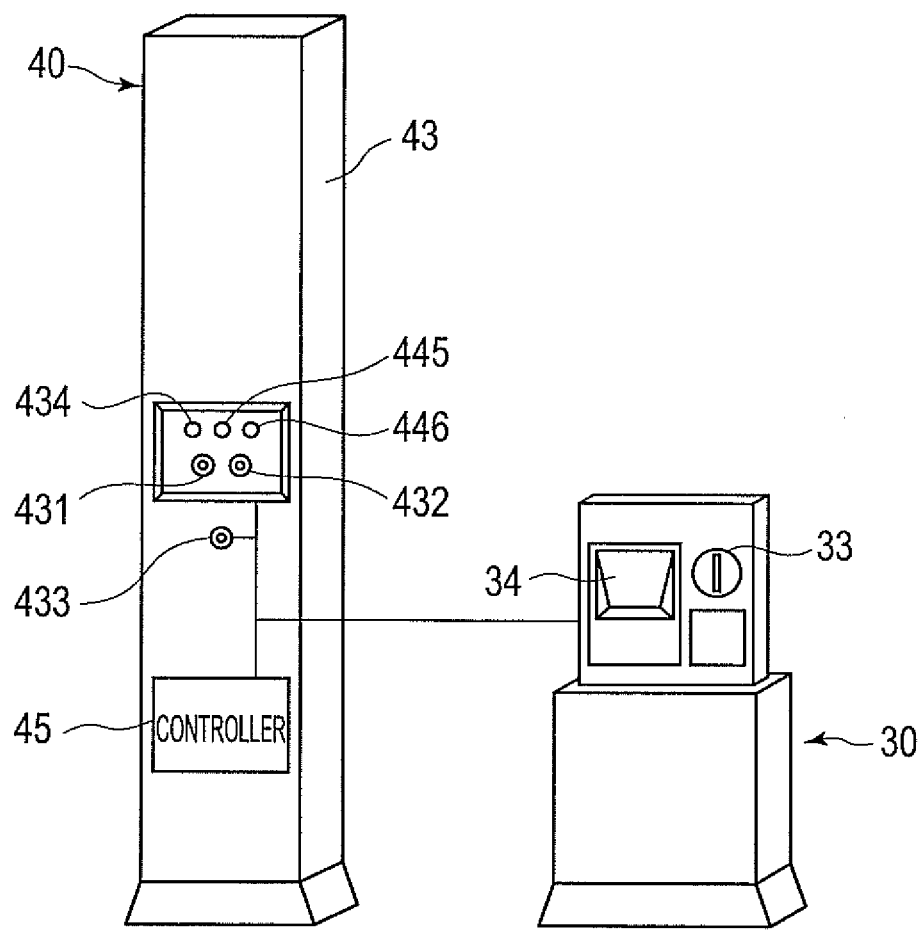
FIG. 9 is a perspective view showing a charging system of another embodiment of the present invention.

It should be noted that in a case where as shown in FIG. 9, the accounting terminal 30 is formed from a coin mech selector 33 and a bill validator 34 only, the accounting terminal 30 need not be connected to the accounting server 20. In this case, the charging system (the accounting terminal 30 and the charger 40) may be provided with a lamp I/F circuit as shown in FIG. 10 and a control I/F circuit as shown in FIG. 11.

Figure 10:
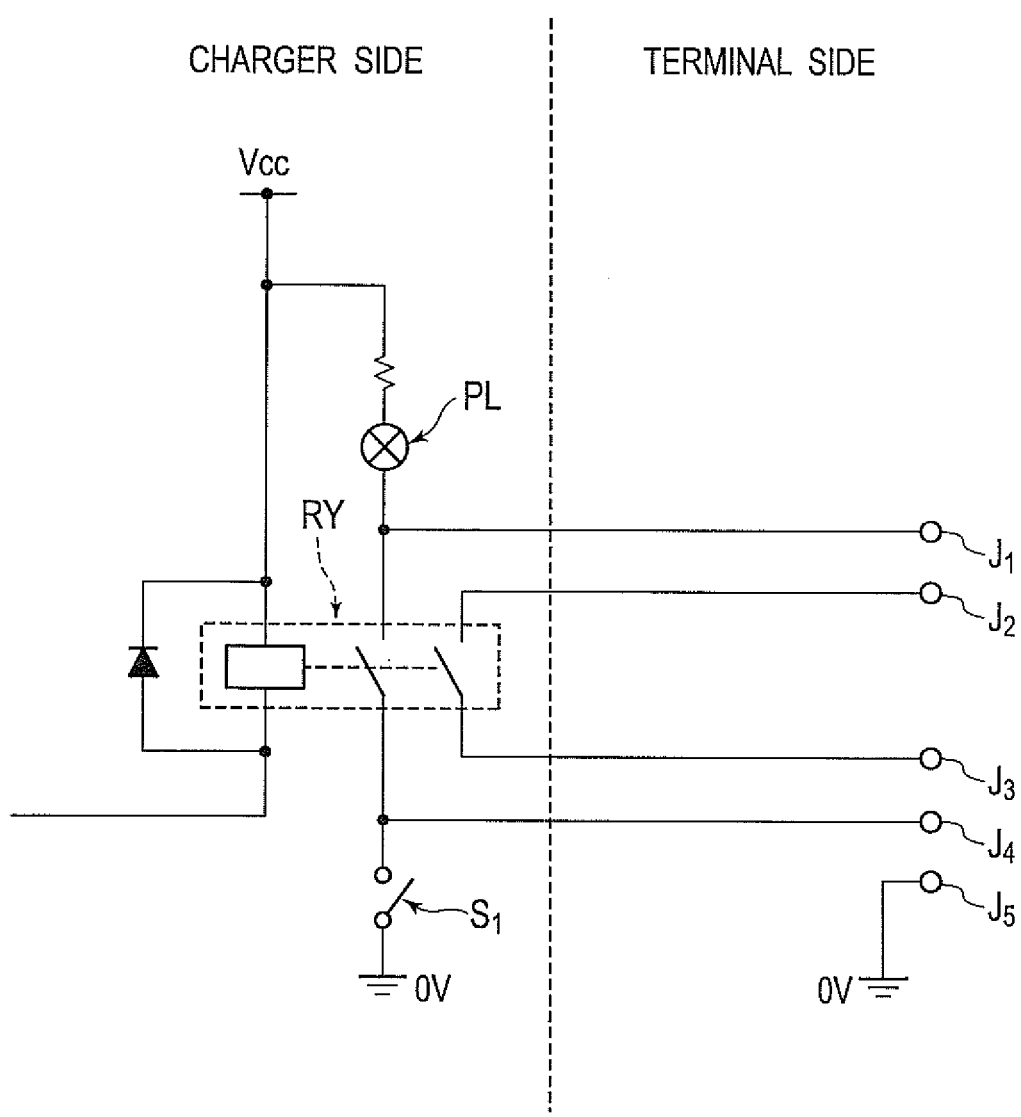
FIG. 10 is a circuit diagram representing a lamp I/F used in the charging system shown in FIG. 9.
Figure 11:
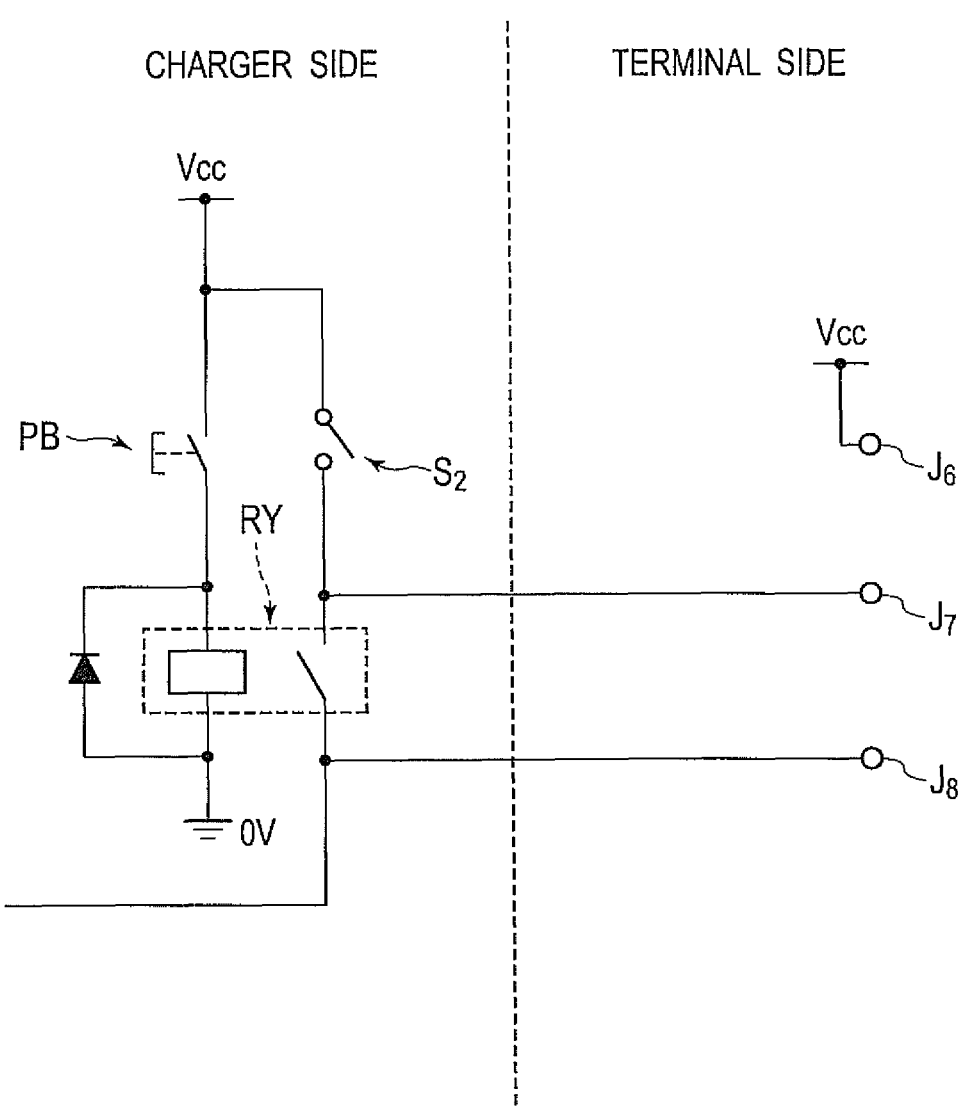
FIG. 11 is a circuit diagram representing a control I/F used in the charging system shown in FIG. 9.

The lamp I/F circuit shown in FIG. 10 is designed to enable the accounting terminal 30 to monitor turned-on and turned-off states of the lamps 434 to 436 of the charger 40, and to turn on and off the lamps 434 to 436.

To put it specifically, the lamp I/F circuit shown in FIG. 10 enables the accounting terminal 30 to acquire the turned-on and turned-off states of lamps PL (corresponding to the lamps 434 to 436) of the charger 40 with a switch $S_1$ closed and with an electrically conducted state established between contact points $J_2$, $J_3$.

In addition, the lamp I/F circuit enables both the accounting terminal 30 and the charger 40 to turn on and off the lamps PL with the switch $S_1$ closed and with contact points $J_1$, $J_5$ thus short-circuited.

In contrast to this, the lamp I/F circuit enables the accounting terminal 30 to acquire the turned-on and turned-off states of the lamps PL of the charger 40 with the switch $S_1$ opened and with an electrically conducted state established between the contact points $J_2$, $J_3$. With the switch $S_1$ opened and with the contact points $J_1$, $J_5$ thus short-circuited, the lamp I/F circuit enables the accounting terminal 30 to turn on and off the lamps PL while blocking the control on the charger 40 side.

On the other hand, the control I/F circuit shown in FIG. 11 enables the accounting terminal 30 to make the charger 40 start the charging operation, and to detect whether the Start Charge button 431 is pressed down.

To put it specifically, the control I/F circuit shown in FIG. 11 enables the accounting terminal 30 to start to charge the battery of the vehicle 50 with the contact points $J_6$, $J_8$ short-circuited.

With a switch $S_2$ closed and with an electrically conducted state between contact points $J_7$, $J_8$, the accounting terminal 30 is capable of detecting whether or not the Start Charge button 431 of the charger 40 is pressed down. Note that the switch $S_2$ works together with a relay, for example, provided at a coin insertion slot of the coin mech selector 33.

It should be noted that the foregoing embodiment has been described for facilitating the understanding of the present invention but not for limiting the scope of the present invention. For this reason, the components disclosed in the foregoing embedment shall be construed as including all their design variations and equivalents which belong to the technical scope of the present invention.

For example, although the foregoing embodiment has described the example where the accounting system 10 is connected to the controller 45 of the charger 40, the external apparatus to be connected to the controller of the charger is not limited to the accounting system 10. A remote controller configured to perform remote ON/OFF operation of a heater provided in the charger, for example, may be connected to the controller of the charger via the communication interface.

The invention claimed is:

1. A charging system comprising:
an external apparatus including:
an operation device configured to be manipulated for battery charging; and
a processor configured to process billing authentication based on the manipulation of the operation device; and
a charger including:
a power converter configured to convert power into power at a predetermined voltage;
a feeder configured to supply the converted power to a battery;
a charging starter configured to be manipulated to instruct start of charging;
a controller configured to control charging of the battery; and
an interface interposed between the controller and the external apparatus, wherein
the controller waits for a signal to be inputted from the external apparatus via the interface,
based on a first signal inputted from the external apparatus via the interface, the controller selects any one of a first mode in which the charger follows the first signal from the external apparatus and a second mode in which the charger operates on a stand-alone basis, and
the controller starts to control the charging of the battery in the first mode under the condition that a second signal is inputted from the external apparatus via the interface and that the charging starter is manipulated.

2. The charging system according to claim 1, wherein the first signal is a cyclic signal.

3. The charging system according to claim 1, wherein the controller selects the first mode when the first signal is inputted from the external apparatus via the interface within a predetermined length of time after a power is turned on, and selects the second mode when the first signal is not inputted from the external apparatus via the interface within the predetermined length of time.

4. The charging system according to claim 3, wherein:
when the first mode is selected, the controller switches to a first state in which the controller waits for the second signal, and
when the second signal is inputted from the external apparatus via the interface after the controller switches to the first state, the controller switches to a second state in which the controller is capable of starting the charging of the battery.

5. The charging system according to claim 3, wherein, when the second mode is selected, the controller switches to a third state in which the controller is capable of starting the charging of the battery.

6. The charging system according to claim 1, wherein the controller switches from the second mode to the first mode if the first signal is inputted from the external apparatus via the interface while the second mode is selected.

7. The charging system according to claim 5, wherein the controller switches from the second mode to the first mode after completing the charging of the battery if the first signal is inputted via the interface while the second mode is selected.

8. The charging system according to claim 1, wherein the controller switches from the first mode to the second mode if the first signal inputted from the external apparatus via the interface is discontinued while the first mode is selected.

9. A method of controlling a charging system that comprises:
an external apparatus including:
an operation device configured to be manipulated for battery charging; and
a processor configured to process billing authentication based on the manipulation of the operation device; and
a charger including:
a power converter configured to convert power into power at a predetermined voltage;
a feeder configured to supply the converted power to a battery;
a charging starter configured to be manipulated to instruct start of charging;
a controller configured to control charging of the battery; and
an interface interposed between the controller and the external apparatus,
the method comprising:
waiting for a signal from the external apparatus to be inputted via the interface;
selecting, based on a first signal inputted from the external apparatus via the interface, any one of a first mode in which the charger follows the first signal from the external apparatus and a second mode in which the charger operates on a stand-alone basis; and
starting to control charging of the battery in the first mode under a condition that a second signal is inputted into the controller from the external apparatus via the interface and that the charging starter is manipulated.

10. A charging system comprising:
an external apparatus including:
operating means configured to be manipulated for battery charging; and
processing means configured to process billing authentication based on the manipulation of the operation means; and a charger including:
  power converting means configured to convert power into power at a predetermined voltage;
  feeding means configured to supply the converted power to a battery;
  charging starting means configured to be manipulated to instruct start of charging;
  controlling means configured to control charging of the battery; and
  an interface interposed between the controlling means and the external apparatus, wherein
the controlling means is further configured to:
  wait for a signal to be inputted from the external apparatus via the interface;
  based on a first signal inputted from the external apparatus via the interface, select any one of a first mode in which the charging means follows the first signal from the external apparatus and a second mode in which the charging means operate on a stand-alone basis; and
  start to control the charging of the battery in the first mode under the condition that a second signal is inputted from the external apparatus via the interface and that the charging starting means are manipulated.

* * * * *